(12) United States Patent
Yamane et al.

(10) Patent No.: US 8,088,428 B2
(45) Date of Patent: *Jan. 3, 2012

(54) PACKAGED COFFEE DRINK

(75) Inventors: Hidefumi Yamane, Sumida-ku (JP);
Yoshikazu Ogura, Sumida-ku (JP);
Yoko Sugiura, Sumida-ku (JP); Tatsuya Kusaura, Sumida-ku (JP)

(73) Assignee: Kao Corporation, Tokyo (JP)

( * ) Notice: Subject to any disclaimer, the term of this patent is extended or adjusted under 35 U.S.C. 154(b) by 940 days.

This patent is subject to a terminal disclaimer.

(21) Appl. No.: 11/816,982

(22) PCT Filed: Mar. 10, 2006

(86) PCT No.: PCT/JP2006/304716
§ 371 (c)(1),
(2), (4) Date: Aug. 23, 2007

(87) PCT Pub. No.: WO2006/098232
PCT Pub. Date: Sep. 21, 2006

(65) Prior Publication Data
US 2009/0035421 A1    Feb. 5, 2009

(30) Foreign Application Priority Data
Mar. 16, 2005 (JP) ................. 2005-074268

(51) Int. Cl.
*A23F 5/00* (2006.01)
*B65D 81/32* (2006.01)
(52) U.S. Cl. .......... 426/594; 426/595; 426/115
(58) Field of Classification Search .......... 426/45, 426/432, 594, 597
See application file for complete search history.

(56) References Cited

U.S. PATENT DOCUMENTS
5,368,875 A * 11/1994 Hibi et al. .......... 426/466
2002/0051810 A1   5/2002 Suzuki et al.

FOREIGN PATENT DOCUMENTS
EP    1 856 982 A1    11/2007
JP    436148    2/1992
(Continued)

OTHER PUBLICATIONS

JP 2003-204756A Machine Translation.*

(Continued)

*Primary Examiner* — Chhaya Sayala
*Assistant Examiner* — Jerry W Anderson
(74) *Attorney, Agent, or Firm* — Oblon, Spivak, McClelland, Maier & Neustadt, L.L.P.

(57) ABSTRACT

To provide a packaged coffee beverage, which contains chlorogenic acids at high concentration, has good flavor and taste, and is suppressed in the occurrence of sediment during long-term storage. A packaged coffee beverage subjected to heat sterilization treatment, the beverage comprising (A) mono-caffeoylquinic acid, (B) feruloylquinic acid and (C) dicaffeoylquinic acid, wherein (a) a total content of the ingredients (A), (B) and (C) contained in dissolved states in the beverage is from 0.14 to 4% by weight based on the beverage, and the beverage comprises (b) 80% by weight or more of water, (c) magnesium and sodium at a Mg/Na weight ratio of from 0.04 to 1, (d) a coffee extract obtained from roasted coffee beans having an L value of form 16 to 25, and (e) from 0.0024 to 0.0122% by weight of brown color in terms of Food Yellow No. 4.

19 Claims, 2 Drawing Sheets

FOREIGN PATENT DOCUMENTS

Figure 1:
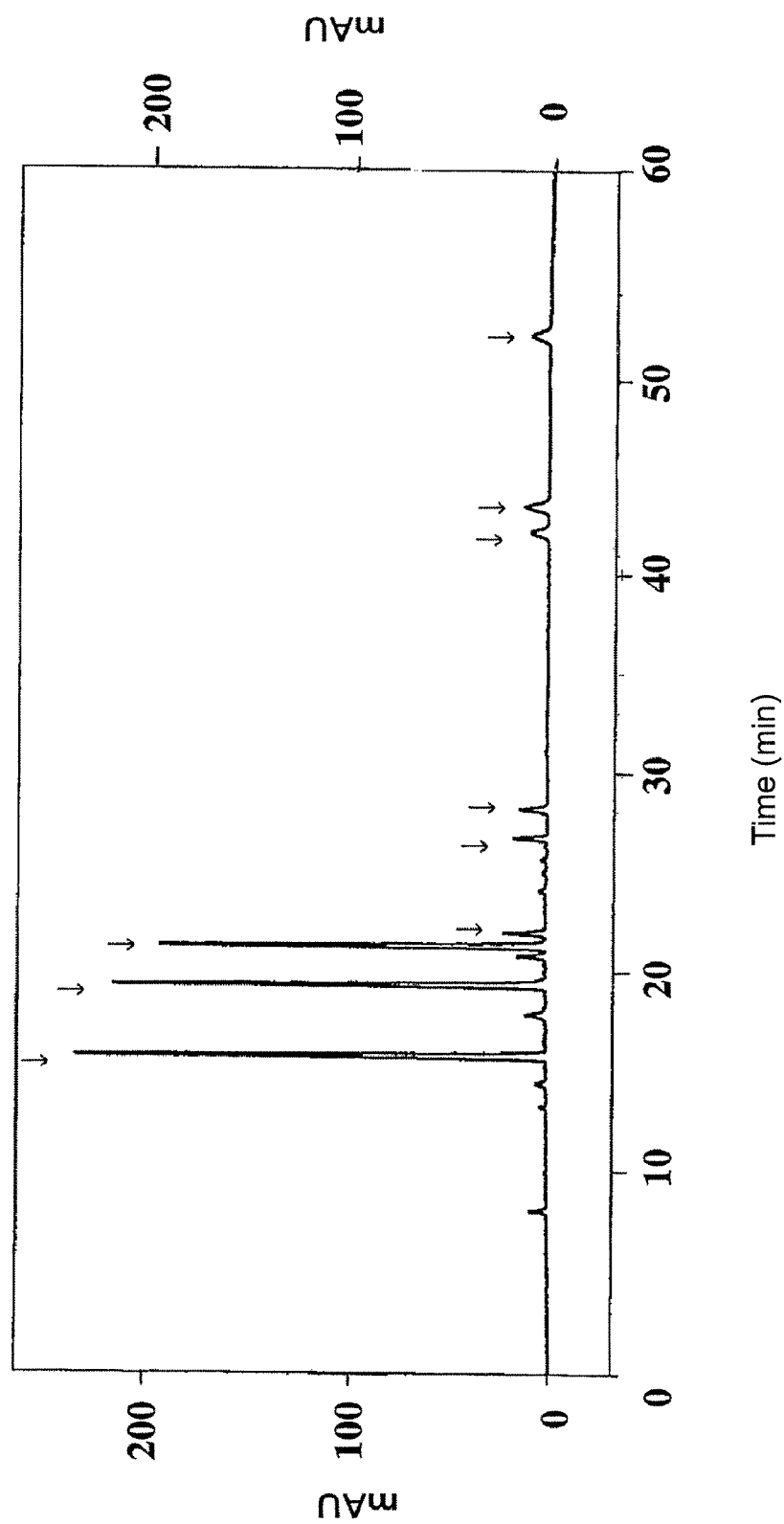

| | | |
|---|---|---|
| JP | 04360647 | 12/1992 |
| JP | 06205641 | 7/1994 |
| JP | 07184546 | 7/1995 |
| JP | 11 225673 | 8/1999 |
| JP | 2002145765 | 5/2002 |
| JP | 2003 204755 | 7/2003 |
| JP | 2003 204756 | 7/2003 |
| JP | 2003-204756 A * | 7/2003 |
| JP | 2003261444 | 9/2003 |
| JP | 2003 284496 | 10/2003 |

OTHER PUBLICATIONS

USDA Nutrient Database Entry.*

Farah, et al., J. Agric. Food Chem 54 (2006) 374-381.*

USDA nutrient Database, No. 14209 downloaded from the internet at http://www.nal.usda.gov/fnic/foodcomp/cgi-bin/list_nut_edit.pl.*

Number.pdf downloaded from the internet at http://www.ionsource.com/Card/number/number.htm.*

U.S. Appl. No. 11/814,170, filed Jul. 18, 2007, Yamane, et al.

U.S. Appl. No. 12/741,424, filed May 5, 2010, Ogura, et al.

"Composition of Foods Raw, Processed, Prepared USDA National Nutrient Database for Standard Reference" Release 2, Sep. 2009 ("USDA Standard Reference"), 54 pgs.

"Coffee", Nutritional Factors, vol. 3: Physiology, Edited by R.J. Clarke and R. Macrae, 1988.

* cited by examiner

PACKAGED COFFEE DRINK

FIELD OF THE INVENTION

The present invention relates to a packaged coffee beverage in which a high concentration of chlorogenic acids, known as useful in terms of physiological effects, is contained in a dissolved state. This beverage contains a coffee extract obtained from roasted coffee beans having an L value of from 16 to 25; is excellent in flavor and taste; and has its sedimentation suppressed over a long period of time.

BACKGROUND OF THE INVENTION

Coffee beverages are high in palatability. Among them, a beverage obtained by milling roasted coffee beans and the so-called instant coffee obtained by drying and granulating coffee extracts are widely consumed in the world. In Japan, packaged coffee beverages produced on an industrial scale are made easy to drink and sold in line with its cultural uniqueness, particularly from the viewpoint of its flavor and taste. These beverages are thus favored as daily drinks.

Coffee beverage has an affluent history in respect to the dietary life as described above. So far, a number of researches have been conduced as to effective components contained in coffee, such as caffeine and chlorogenic acids. In particular, chlorogenic acids have been reported to have antihypertensive effects, alleviating effects for unidentified complaints syndrome such as systemic malaise and weakness caused by autonomic imbalance, fatigability and the like, and vascular endothelial function improving effects (e.g., Patent Document 1 to 3).

With regard to packaged coffee beverages on the market, there are many brands ranging from those of the American type to those oriented toward the body typical of coffee, including black coffee, sugared coffee and milked coffee. However, the amount of the chlorogenic acids contained in such a beverage is relatively low. Specifically, the amount of the chlorogenic acids actually contained in such a beverage is no more than 0.05-0.1% by weight.

The centerpiece of the packaged coffee beverages commercially available in Japan has a volume ranging from 190 to 300 g, and such volume is becoming mainstream in Japan. Especially, those having a volume of 190 g are increasingly demanded. Therefore, the packaged coffee beverages need to be highly concentrated so as to contain chlorogenic acids enough to exert physiological effects within the limited volume.

Many methods intended to improve the storage stability of packaged coffee beverages have been proposed. For example, a method of a coffee extract can be mentioned in this context, which includes a method that brings a coffee extract into contact with a medium-basic or weakly-basic anion exchange resin to adsorb and eliminate low molecular weight substances such as formic acid, acetic acid and propionic acid; and a method in which a coffee extract is brought into contact with silica gel to eliminate fine particulate clouding materials. These methods are, however, both accompanied by problems such that they require extra equipment in production and after long-term storage at high temperatures; the flavor and taste are apparently lowered beyond the levels required for them (e.g., Patent Document 4 and 5).

On the other hand, there are a method that adds a cellulosic mucous materials and a method that removes sediment components by conducting a treatment with a mannanase or adding an acid. These enzymatic treatment and acid treatment are, however, known to result in a marked loss of natural flavor and taste such as the development of a strong sour taste (see, for example, Patent Documents 6 to 8).

[Patent Document 1] JP-A-2002-053464
[Patent Document 2] JP-A-2002-145765
[Patent Document 3] JP-A-2003-261444
[Patent Document 4] JP-A-04-036148
[Patent Document 5] JP-A-04-360647
[Patent Document 6] JP-A-06-205641
[Patent Document 7] JP-A-07-184546
[Patent Document 8] JP-A-11-225673

DISCLOSURE OF THE INVENTION

This invention provides a packaged coffee beverage subjected to heat sterilization treatment, which contains (A) monocaffeoylquinic acid, (B) feruloylquinic acid and (C) dicaffeoylquinic acid, wherein (a) a total content of the ingredients (A), (B) and (C) contained in dissolved states in said beverage is from 0.14 to 4% by weight based on the packaged beverage, and the beverage contains:

(b) 80% by weight or more of water, (c) magnesium and sodium at a Mg/Na weight ratio of from 0.04 to 1, (d) a coffee extract obtained from roasted coffee beans having an L value of from 16 to 25, and (e) from 0.0024 to 0.0122% by weight of brown color in terms of Food Yellow No. 4.

This invention also provides a method for suppressing sedimentation in a packaged coffee beverage, wherein a total content of (A) monocaffeoylquinic acid, (B) feruloylquinic acid and (C) dicaffeoylquinic acid in dissolved states is from 0.14 to 4% by weight based on the beverage; the beverage contains a coffee extract obtained from roasted coffee beans having an L value of from 16 to 25; and brown color is adjusted to be from 0.0024 to 0.0122% by weight in terms of Food Yellow No. 4.

BRIEF DESCRIPTION OF THE INVENTION

FIG. 1 An HPLC analysis chart of chlorogenic acids is shown.

Figure 2:
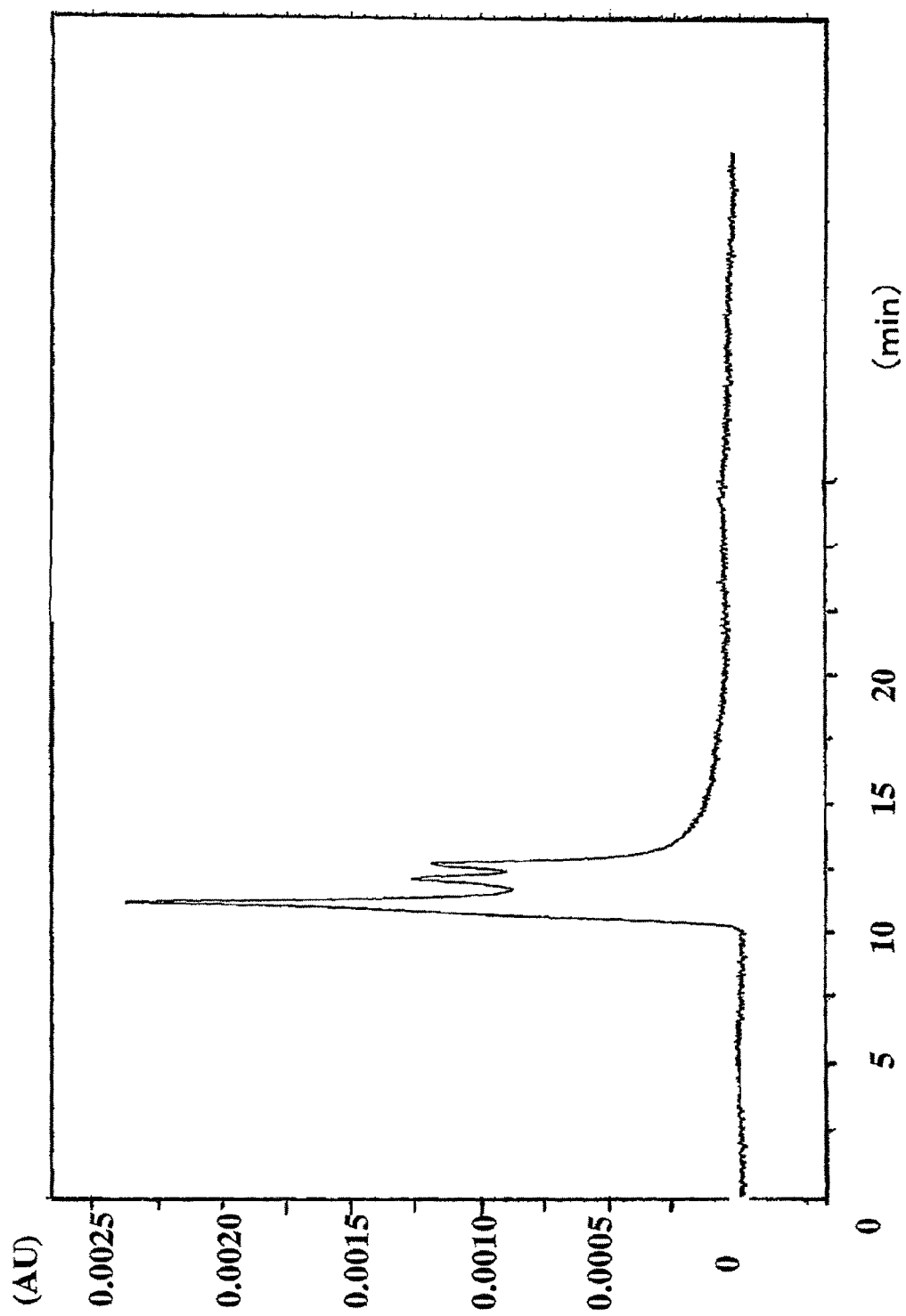

FIG. 2 An HPLC analysis chart of brown color is shown.

DETAILED DESCRIPTION OF THE INVENTION

As mentioned above, the content of chlorogenic acids in the beverage needs to be increased so as to have chlorogenic acids contained in an amount enough to fully exhibit their physiological effects within the limited package volume. However, it was found in the course of the present investigation that, if a strong coffee extract is simply used and chlorogenic acids, effective ingredients from the standpoint of physiological effects, are added at a higher concentration than usual, a problem arises in that the formation speed of sediment during long-term storage increases pronouncedly.

The conventional stabilizing methods for coffee beverages, on the other hand, are accompanied by a problem in that they impair the flavor and taste of coffee.

Accordingly, the present invention provides a packaged coffee beverage, which contains chlorogenic acids at high concentration, contains a coffee extract obtained from roasted coffee beans having an L value of from 16 to 25, has good flavor and taste, and causes no sediment during long-term storage.

The present inventor, therefore, conducted an investigation on a possible correlation between the concentrations of individual components in a coffee extract and the amount of formed sediment which is used as an index for storage stability by a method that individually observed the coffee components. As a result, it has been found that control of brown color in a packaged coffee beverage, which contains a coffee extract obtained from roasted coffee beans having an L value of from 16 to 25, makes it possible to obtain a packaged coffee beverage having high palatability and long-term storage stability even when the packaged coffee beverage contains chlorogenic acids at extremely high concentration in the beverage.

The packaged coffee beverage according to the present invention contains chlorogenic acids, which have various physiological effects, at high concentration, has a good flavor and taste inherent to coffee and, even when stored over a long period of time, is free from the formation of sediment and is also good in stability.

In the packaged coffee beverage according to the present invention, various chlorogenic acids are contained in dissolved states. These chlorogenic acids includes the following three types of ingredients: (A) monocaffeoylquinic acid, (B) feruloylquinic acid, and (C) dicaffeoylquinic acid (in FIG. 1, the arrowed peaks correspond to them). As the ingredient (A), one or more monocaffeoylquinic acids selected from 3-caffeoylquinic acid, 4-caffeoylquinic acid and 5-caffeoylquinic acid can be mentioned. As the ingredient (B), one or more feruloylquinic acids selected from 3-feruloylquinic acid, 4-feruloylquinic acid and 5-feruloylquinic acid can be mentioned. As the ingredient (C), one or more dicaffeoylquinic acid selected from 3,4-dicaffeoylquinic acid, 3,5-dicaffeoylquinic acid and 4,5-dicaffeoylquinic acid can be mentioned.

The expression "chlorogenic acids in dissolved states" means chlorogenic acids which pass through a membrane filter ("GL Chromatodisk 25A", product of GL Science, Inc., pore size: 0.45 μm) when the coffee beverage is filtered through the membrane filter.

In the present invention, the total content of the ingredients (A), (B) and (C) is from 0.14 to 4% by weight based on the packaged beverage. A total content of 0.14% by weight is preferred to exhibit their physiological effects. A total content higher than 4% by weight, however, impairs the physical stability of the chlorogenic acids themselves in the packaged beverage. From the viewpoint of physiological effects, the total content of the ingredients (A), (B) and (C) may be preferably from 0.15 to 3.9% by weight, more preferably from 0.2 to 3.5% by weight, still more preferably from 0.26 to 3% by weight, even still more preferably from 0.3 to 2.5% by weight. To further increase the physical stability, the total content of the ingredients (A), (B) and (C) may preferably be 1% by weight or lower, with 0.5% by weight or lower being more preferred.

The magnesium/sodium weight ratio of magnesium to sodium used in the present invention may be preferably from 0.04 to 1, more preferably from 0.08 to 0.7, still more preferably from 0.12 to 0.6, even more preferably from 0.17 to 0.5. A Mg/Na weight ratio smaller than 0.04 leads to a stronger salty taste and impairs the flavor and taste, while a Mg/Na weight ratio greater than 1 develops a problem that the storage stability is impaired.

Control of the magnesium/sodium ratio to the above-described ratio can be conducted by adding a sodium salt such as sodium ascorbate, sodium hydroxide or sodium hydrogencarbonate or magnesium salt such as magnesium chloride, magnesium carbonate or magnesium glutamate.

The packaged coffee beverage according to the present invention contains water in an amount of 80% by weight or precisely in an amount of from 80 to 99.8% by weight, with from 85 to 99% by weight being preferred.

The brown color in the packaged coffee beverage according to the present invention means brown color existing in a dissolved state in the coffee beverage, and consists of fractions corresponding to molecular weights of 250,000 and higher as measured by a method to be described subsequently herein. These fractions correspond to the peaks whose retention times are shorter than 14 minutes in FIG. 2.

The brown color is known to be a characteristic of roasted coffee, but there are not much data about its properties and structures. They are, hence, still under a nearly unknown situation. The expression "brown color existing in a dissolved state" means brown color which passes through a membrane filter ("DISMIC-13CP, cellulose acetate membrane, pore size: 0.45 μm, ADVANTEC MFS, Inc.) when the coffee beverage is filtered through the membrane filter.

The content of the brown color (in terms of Food Yellow No. 4) in the present invention is may be preferably from 0.0024 to 0.0122% by weight, more preferably from 0.0026 to 0.0115% by weight, still more preferably from 0.0028 to 0.0105% by weight, even more preferably from 0.003 to 0.01% by weight, yet more preferably from 0.004 to 0.009% by weight. A content lower than 0.0024% by weight cannot provide good bitterness characteristic to coffee beverages, while a content higher than 0.0122% by weight leads to the formation of sediment materials in an early stage of storage in the case of a packaged coffee beverage containing chlorogenic acids at a concentration of 0.19% by weight or higher.

The E/D weight ratio of 4-caffeoylquinic acid (E) to 3-caffeoylquinic acid (D) in the present invention may be preferably from 0.6 to 1.2, more preferably from 0.65 to 1.15, still more preferably from 0.7 to 1.1, even more preferably from 0.8 to 1, from the standpoint of the flavor and taste of the coffee beverage. On the other hand, the F/D weight ratio of 5-caffeoylquinic acid (F) to 3-caffeoylquinic acid (D) may be preferably from 0.6 to 3, more preferably from 0.7 to 2, still more preferably from 0.75 to 1.8, even more preferably from 0.8 to 1.5, from the standpoint of the flavor and taste of the coffee beverage.

As a heat sterilization method in the present invention, it is preferred from the viewpoint of microbiologically improving long-term stability to conduct sterilization treatment such that the F value (250° F. (121° C.); see "Antibacterial and Antifungal Handbook" (in Japanese) compiled by The Society of Antibacterial and Antifungal Agents, Japan, P642 (Gihodo Shuppan Co., Ltd.) becomes 20 minutes, preferably 30 minutes or longer, more preferably 40 minutes or longer.

The packaged coffee beverage according to the present invention can be obtained by extracting roasted coffee beans or their ground product with water or hot water, and sterilizing the extract, flowed by packaging, or packaging the extract, followed by sterilization, in accordance with methods commonly known in the art.

Without being limited to such conventional methods, the content of chlorogenic acids can also be controlled by mixing a non-roasted plant extract of a plant, which contains chlorogenic acids, into the roasted coffee bean extract. As the plant containing chlorogenic acids and useful for the preparation of the non-roasted plant extract, coffee beans, *Crataegus*, grape, cnidium rhizome, Japanese angelica root, coptis rhizome, turmeric, asafetida, sweet potato, mulukhiyya or the like can be mentioned. From the viewpoint of readiness in controlling the flavor and taste of the coffee beverage, coffee beans are preferred. It is, therefore, possible to control the composition of chlorogenic acids by mixing a raw coffee bean extract into a conventional roasted coffee extract. A coffee extract can also be prepared by using coffee beans having a single degree of roasts.

No particular limitation is imposed on the variety of coffee beans for use in the present invention. Examples, however, include Brazil, Columbia, Tanzania, Mocha, and so on. Coffee beans may be of a single variety, or plural varieties may be blended and used. Roasting can be conducted by a usual method, and the degree of roasts can be adjusted as desired depending on the desired taste. Described specifically, the darker the roasts, the stronger the bitterness, and the lighter the roasts, the stronger the sour taste. As the upper limit of the L value of the roasted beans in (d), it may be preferably 25 or smaller, more preferably 23 or smaller, still more preferably 22 or smaller, even more preferably 20 or lower, from the standpoint of flavor and taste. As the lower limit of the L value of the roasted beans in (d), it may be preferably 16 or greater, more preferably 17 or greater, still preferably 18 or greater, because at such an L value, the amount of chlorogenic acids remaining in roasted beans is large and hence, desirable.

Especially from the standpoints of flavor and taste and storage stability, it is preferred to use as the coffee extract (d) an extract obtained from roasted coffee beans having an L value of from 16 to 20 and to add an extract obtained from roasted coffee beans having an L value of 25 or greater (for example, an L value of from 25 to 50) or raw coffee beans.

The raw coffee bean extract can be obtained preferably by grinding raw coffee beans as needed and extracting them with ethanol, water-containing ethanol, methanol or the like at room temperature to 100° C. As a commercially-available raw coffee bean extract, "Flavor Holder RC-30R" or the like can be mentioned.

The term "coffee beverage" as defined herein means to encompass all of coffee-added soft beverages, coffee beverages and coffee as defined in the Fair Competition Code for labeling of coffee beverages, etc.

The term "single strength" as defined herein means packaged beverages which is ready to drink without dilution after opening, so that concentrated coffee which requires dilution as a premise upon drinking should be specifically excluded from the scope of the present invention.

To the coffee beverage according to the present invention, sugar ingredients such as sucrose, glucose, fructose, xylose, fructoglucose syrup and sugar alcohol, milk components, antioxidants, pH regulators, emulsifiers, flavors and the like can be added as desired. These milk components can include raw milk, cow milk, whole milk powder, skimmilk powder, fresh cream, concentrated milk, skimmilk, partially skimmed milk, condensed milk, and the like.

As the pH of the coffee beverage according to the present invention, 4 to 7, more specifically 5 to 7 is preferred from the standpoint of the stability of the beverage.

As the pH regulators, sodium carbonate, sodium hydrogencarbonate, disodium hydrogenphosphate, potassium carbonate and the like can be mentioned. From the viewpoint of aroma and taste, however, an alkaline sodium salt or alkaline potassium salt is preferred, with sodium hydrogencarbonate being most preferred. These salts can be added generally at from 0.03 to 0.3% by weight, preferably at from 0.05 to 0.2% by weight to the final product (one diluted with water to adjust the amount of roasted beans to a predetermined concentration).

As the antioxidants, ascorbic acid and its salts, erythorbic acid and its salts, and the like can be mentioned. Among these, ascorbic acid and its salts are preferred.

As the emulsifiers, sucrose fatty acid esters, glycerin fatty acid esters, microcrystalline cellulose, lecithines, sorbitan fatty acid esters, polyglycerin fatty acid esters, and the like are preferred.

As packages useful in the present invention, PET bottles, cans (aluminum, steel), paper, retort pouches, bottles (glass), and the like can be mentioned.

When the coffee beverage is filled in a package feasible for heat sterilization such as a metal can, the sterilization treatment in the present invention is conducted under sterilization conditions prescribed in the Food Sanitation Act. For those which cannot be subjected to retort sterilization like PET bottles or paper packages, a process is adopted such that the coffee beverage is sterilized beforehand under similar sterilization conditions as prescribed in the Food Sanitation Act, for example, at a high temperature for a short time with a plate-type heat exchanger, and then beverage is cooled to a particular temperature and filed in a package. It is also possible to conduct an operation such that subsequent to heat sterilization under sterilized conditions, the pH of the coffee beverage is caused to return to neutral under aseptic conditions or that subsequent to heat sterilization under neutral conditions, the pH of the beverage is caused to drop back to the acidic side under aseptic conditions.

EXAMPLES

1. Preparation Procedure of Coffee Extracts

By a "High Cut Coffee Mill" (manufactured by Kalita Co., Ltd.; gauge: at the middle between 3 and 4), amounts of coffee beans (*Arabica* species) roasted to L values of 25, 22, 18 and 16, respectively, were separately ground, and were then separately sieved by a stainless-steel-made sieve (opening size: 355 μm). Ground beans remained on the sieve were provided as samples for extraction.

Using a stainless-steel-made drip brewer, the ground bean samples were separately extracted with hot water of 95° C. to obtain extracts. After those extracts were separately cooled to 20° C., centrifugation was conducted (8,000 rpm, 30 minutes, 20° C.). Precipitated solids were then removed to provide coffee extracts. From the roasted beans having the L values of 25, 22, 18 and 16, coffee extracts A, B, C and D were obtained, respectively.

2. Preparation Procedure of Coffee Beverages

The individual extracts were mixed as shown in Table 1. After adding an aqueous solution of sodium bicarbonate, the extracts were heated to 87° C., filled in the packages in Table 1, and then subjected to heat sterilization to produce packaged beverages.

3. Analysis of Chlorogenic Acids

The following method was followed for the analysis of chlorogenic acids in the coffee beverage compositions. HPLC was used as analysis equipment. Model numbers of components units of the equipment were as follows.

UV-VIS detector: "L-2420" (Hitachi High-Technologies Corporation), column oven: "L-2300" (Hitachi High-Technologies Corporation), pump: "L-2130" (Hitachi High-Technologies Corporation), autosampler: "L-2200" (Hitachi High-Technologies Corporation), column: "Inertsil ODS-2" (inner diameter 4.6 mm×length 250 mm, particle size: 5 μm) (GL Science, Inc.).

Analysis conditions were as follows:

Sample load volume: 10 μL, flow rate: 1.0 mL/min, wavelength setting for UV-VIS detector: 325 nm, temperature setting for column oven: 35° C., eluent A: 0.05 M acetic acid, 0.1 mM 1-hydroxyethane-1,1-diphosphonic acid, 3 (V/V) % acetonitrile solution, eluent B: 0.05 M acetic acid, 0.1 mM 1-hydroxyethane-1,1-diphosphonic acid, 97 (V/V) % acetonitrile solution.

| Concentration gradient conditions | | |
|---|---|---|
| Time | Eluent A | Eluent B |
| 0 min | 100% | 0% |
| 20 min | 87% | 13% |
| 25 min | 87% | 13% |
| 27 min | 85% | 15% |
| 45 min | 85% | 15% |
| 55 min | 80% | 20% |
| 60 min | 0% | 100% |
| 70 min | 0% | 100% |
| 75 min | 100% | 0% |
| 100 min | 100% | 0% |

In HPLC, each beverage sample (1 g) was accurately measured, increased in total volume to 10 mL with the eluent A, subsequent to filtration through a membrane filter ("GL Chromatodisk 25A", GL Science, Inc., pore size: 0.45 μm), and subjected to an analysis.

Retention times of chlorogenic acids (unit: min)—($A^1$) monocaffeoylquinic acid: 15.7, 19.2, 21.2 (3 data in total), ($A^2$) feruloylquinic acid: 21.9, 26.6, 28.1 (3 data in total), and ($A^3$) dicaffeoylquinic acid: 42.1, 43.3, 51.8 (3 data in total) (FIG. 1). From 9 area values of the chlorogenic acids as determined by the analysis, their weight percentages were determined using 5-caffeoylquinic acid as a standard substance.

4. Analysis of Brown Color

An analysis method of brown color in each coffee beverage composition was as follows. The analysis was conducted by size-exclusion chromatography. Model numbers of components units of the equipment were as follows.

UV-VIS detector: "SPD-10A" (Shimadzu Corporation), differential spectrometer: "RID-10A" (Shimadzu Corporation), column oven: "CTO-10A" (Shimadzu Corporation), pump: "LC-10ATvp" (Shimadzu Corporation), autosampler: "SIL-10A" (Shimadzu Corporation), system controller: "SCL-10Avp" (Shimadzu Corporation), guard column: "TSKguardcolumn PWXL" (inner diameter 6.0×length 40 mm) (TOSOH CORPORATION), column: "TSKgel G4000PWXL" (inner diameter 7.8 mm×length 300 mm, particle size: 10 μm) (TOSOH CORPORATION).

Analysis conditions were as follows:

Sample load volume: 10 μL, flow rate: 1.5 mL/min, wavelength setting for UV-VIS detector: 420 nm (AUX RANGE: 2, REC.RANGE: 1.00, response: 4, sampling cycle: 100 msec), eluent: distilled water for high-performance liquid chromatography (Kanto Chemical Co., Ltd.), temperature setting for column oven: 35° C.

The time from the can opening of each beverage to be measured until sample loading was set within 15 minutes.

After the can was opened, the sample (0.1 to 0.3 g) was accurately weighed, increased in total volume to 10 mL with distilled water for high-performance liquid chromatography (Kanto Chemical Co., Ltd.), gently tumbled and stirred, filtered through a membrane filter ("DISMIC-13CP, cellulose acetate membrane, pore size: 0.45 μm; ADVANTEC MFS., INC.), and then subjected to a measurement.

By the UV-VIS detector, a measurement was performed at 420 nm. Based on a chromatogram so obtained (FIG. 2, "AU" in the figure stands for "Absorbance Unit"), the weight percentage of the brown color was determined from the area value of eluate fractions corresponding to molecular weights of 250,000 and higher using Food Yellow No. 4 (Tokyo Chemical Industry CO., LTD) as a standard substance.

The term "Food Yellow No. 4" used in the invention means one containing 85.0% or more of 5-hydroxy-1-(4-sulfophenyl)-4-(4-sulfophenylazo)-3-pyrazolecarboxylic acid, trisodium salt ($C_{16}H_9N_4Na_3O_9S_2$) (molecular weight: 534.37), and was authorized as a food additive under "Food Yellow No. 4, Tartrazine" on Jul. 15, 1964 (SHOWA 39). It has also been authorized as a food additive by FAO/WHO and in EU, US and other countries ("Food Safety Seminar 2—Food Additives" (in Japanese), P163, Aug. 20, 2001: First edition, first print published; and "Food Sanitation Six Basic Laws" (in Japanese), 1996 Edition, P959).

The content of Food Yellow No. 4 as the standard substance was confirmed in accordance with "Specifications and Standards for Foods, Food Additives, Etc., Category-2 Additives" (in Japanese) (Notification No. SHO 34-370 of the Ministry of Health and Welfare).

A molecular weight calibration curve was prepared by using, as molecular weight standard substances, nine points obtained from the following nine pullulan standard products: "P-1", "AP-5", "P-10", "P-20", "P-50", "P-100", "P-200", "P-400" and "P-800" (Showa Denko K.K.).

5. L-value Measurement of Roasted Coffee Beans

L-value measurement was conducted by a calorimeter, "ZE-2000" (Nippon Denshoku Industries Co., Ltd.).

A roasted coffee bean sample was ground by the "High Cut Coffee Mill" (manufactured by Kalita Co., Ltd.; gauge: at 1) such that its particle size was reduced to 500 μm or smaller. The ground beans were charged to fill up a measurement cell, and gently pressed from the top so that no vacancy was formed in a bottom part of the cell. Its measurement was conducted at least three times, and the reflectance of the sample when the reflectance of a standard white board was assumed to be 100 was recorded as its L value.

6. Measurement of Water Contents

The measurement of each water content was conducted by an ambient-pressure heat drying method.

The constant weight of a glass weighing dish with silica sand placed therein as a drying aid was determined beforehand ($W_1$ (g)).

A sample was collected in the weighing dish, and the weighing dish with the silica sand and collected sample contained therein was measured ($W_2$ (g)).

Predrying was conducted over a water bath, and the sample was then dried by a forced-circulation hot air dryer.

After the weighing dish with the silica sand and dried sample contained therein was allowed to cool down in a silica gel desiccator, they were weighed ($W_3$ (g)). A calculation was then conducted in accordance with the following equation:

$$\text{Water content}(g/100 \ g)=(W_2-W_3)/(W_2-W_1)\times 100$$

7. Analysis of Sodium

The measurement of a sodium content was conducted by atomic absorption photometry (HCl extraction).

Described specifically, 10% hydrochloric acid was added to a sample (2 to 6 g) such that a 1% hydrochloric acid solution would be obtained when adjusted to a predetermined constant volume. After the mixture was brought to the predetermined constant volume with deionized water, the measurement of its absorbance was conducted.

The measurement by an atomic absorption photometer was conducted at a wavelength of 589.6 nm in an acetylene-air flame (Reference: "Analytical Methods for Nutrition Labeling in Japan" (in Japanese), Notice No. 13, Office of Health Policy for Newly-Developed Foods, Life Sanitation Bureau, Ministry of Health and Welfare).

8. Analysis of Magnesium

The measurement of a magnesium content was conducted by ICP emission spectroscopy.

A sample (5 to 6 g) was collected in a beaker, and was ashed in an electric furnace (500° C., 5 to 6 hours). 20% hydrochloric acid was then added, followed by evaporation to dryness on a hot plate. 20% hydrochloric acid was added further, followed by heating on the hot plate (100° C., for 30 minutes). Subsequent to filtration through filter paper (No. 5A), the filtrate was adjusted to a predetermined constant volume in a graduated flask, and was then measured by an ICP emission spectrometer (measurement wavelength: 285.213 nm) (Reference: "Analytical Methods for Nutrition Labeling in Japan" (in Japanese), Notice No. 13, Office of Health Policy for Newly-Developed Foods, Life Sanitation Bureau, Ministry of Health and Welfare).

9. Assessment of Flavor and Taste and Storage Stability

With respect to the packaged coffee beverages shown in Table 1, assessments of their flavors and tastes and storage stability were performed.

Assessment of Flavor and Taste
   1: Good, 2: Slightly good, 3: Average,
   4: Slightly unpleasant, 5: Unpleasant.

Storage Stability (stored at 55° C. for 1 week)
   1: Substantially no sediment, 2: Some sediment,
   3: Not desired as a commercial product due to the occurrence of sediment.

The invention claimed is:

1. A packaged coffee beverage subjected to heat sterilization treatment, comprising (A) monocaffeoylquinic acid, (B) feruloylquinic acid and (C) dicaffeoylquinic acid, wherein
   (a) a total content of said ingredients (A), (B) and (C) contained in dissolved states in said beverage is from 0.14 to 4% by weight based on said beverage, and said beverage comprises:
   (b) 80% by weight or more of water,
   (c) magnesium and sodium at a Mg/Na weight ratio of from 0.04 to 0.7,
   (d) a coffee extract obtained from roasted coffee beans having an L value of from 16 to 25, and
   (e) an amount of brown colorant to achieve an equivalent degree of coloration as compared to that achieved from a 0.0024 to 0.0122% by weight solution of Food Yellow No. 4.

2. The packaged coffee beverage according to claim 1, wherein a weight ratio of 4-caffeoylquinic acid to 3-caffeoylquinic acid is from 0.6 to 1.2, and a weight ratio of 5-caffeoylquinic acid to 3-caffeoylquinic acid is from 0.01 to 3.

3. The packaged coffee beverage according to claim 1 or 2, which is in a single strength form.

4. The packaged coffee beverage according to any one of claim 1 or 2, further comprising an alkaline sodium salt or alkaline potassium salt added therein.

5. A method for suppressing sedimentation in a packaged coffee beverage comprising a total content of (A) monocaffeoylquinic acid, (B) feruloylquinic acid and (C) dicaf-

TABLE 1

| | | Inventive Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| Coffee extract A | (g) | 177 | | | | 884 | 120 | 640 | 740 | 111 | | 504 |
| Coffee extract B | (g) | | 211 | | | | 160 | | 50 | | | |
| Coffee extract C | (g) | | | | 412 | | 210 | 50 | 30 | | | |
| Coffee extract D | (g) | | | 298 | | | 190 | 25 | | | 794 | |
| Raw coffee bean extract "FH-1041" | (g) | 6.9 | 6.7 | 8.5 | 7.5 | 0.4 | | | | 7.9 | 10.5 | |
| Deionized water | (g) | | | | | | Balance | | | | | |
| Total weight | (g) | | | | | | 100 | | | | | |
| Heat sterilization | Temp. (° C.) | | | | | | 121 | | | | | |
| | Time (min) | | | | | | 10 | | | | | |
| Package | | | | | | | Metal can | | | | | |
| Analysis results | Units | | | | | | | | | | | |
| Chlorogenic acids | (mg/100 g) | 263 | 263 | 263 | 257 | 360 | 149 | 262 | 315 | 263 | 360 | 263 |
| 4-Caffeoylquinic acid/3-caffeoylquinic acid | (Weight ratio) | 0.93 | 0.94 | 0.96 | 0.96 | 0.93 | 0.94 | 0.96 | 0.93 | 0.93 | 0.96 | 0.93 |
| 5-Caffeoylquinic acid/3-caffeoylquinic acid | (Weight ratio) | 1.02 | 1.05 | 1.12 | 1.14 | 1.02 | 1.05 | 1.14 | 1.02 | 1.02 | 1.12 | 1.02 |
| Water content | (g/100 g) | 98.9 | 98.8 | 98.6 | 98.4 | 98.2 | 98.1 | 98.1 | 97.8 | 98.9 | 98.1 | 98.2 |
| Na | (mg/100 g) | 15.3 | 19.4 | 32.0 | 40.5 | 76.4 | 66.1 | 62.8 | 71.4 | 9.6 | 85.4 | 0.2 |
| Mg | (mg/100 g) | 2.8 | 3.2 | 3.9 | 6.4 | 14.2 | 10.1 | 11.4 | 13.1 | 1.8 | 10.4 | 13.8 |
| Mg/Na | (Weight ratio) | 0.19 | 0.16 | 0.12 | 0.16 | 0.19 | 0.15 | 0.18 | 0.18 | 0.19 | 0.12 | 69.0 |
| Brown color (in terms of FD & C Yellow No. 4) | (mg/100 g) | 2.4 | 3.2 | 5.1 | 6.6 | 12.2 | 10.7 | 10.1 | 11.4 | 1.5 | 13.6 | 10.8 |
| Assessment of flavor and taste (shortly after production) | | 2 | 2 | 1 | 1 | 2 | 1 | 1 | 1 | 4 | 2 | 1 |
| Storage stability (stored at 55° C. for 1 week) | | 1 | 1 | 1 | 2 | 1 | 1 | 1 | 1 | 1 | 3 | 3 |

As is readily envisaged from Table 1, a coffee beverage which contains monocaffeoylquinic acid, feruloylquinic acid and dicaffeoylquinic acid can be provided with good storage stability and good flavor and taste when the magnesium/sodium weight ratio and the content of brown color are controlled to from 0.04 to and from 0.0024 to 0.0122% by weight, respectively.

feoylquinic acid in dissolved states in said beverage being from 0.14 to 4% by weight based on said beverage, wherein the beverage contains a coffee extract obtained from roasted coffee beans having an L value of from 16 to 25 and magnesium and sodium at a Mg/Na weight ratio of from 0.04 to 0.7, comprising adjusting an amount of brown colorant in a packaged coffee beverage to achieve an equivalent degree of coloration to that achieved from a 0.0024 to 0.0122% by weight solution of Food Yellow No. 4.

6. The packaged coffee beverage according to claim 1, wherein a total content of said ingredients (A), (B) and (C) contained in dissolved states in said beverage is from 0.14 to 3% by weight based on said beverage.

7. The packaged coffee beverage according to claim 1, wherein a total content of said ingredients (A), (B) and (C) contained in dissolved states in said beverage is from 0.3 to 2.5% by weight based on said beverage.

8. The packaged coffee beverage according to claim 1, wherein a Mg/Na weight ratio is from 0.12 to 0.6.

9. The packaged coffee beverage according to claim 1, wherein water is present in an amount of 85 to 99% by weight.

10. The packaged coffee beverage according to claim 1, wherein brown colorant is present to achieve an equivalent degree of coloration as compared to that achieved from a 0.003 to 0.01% by weight solution of Food Yellow No. 4.

11. The packaged coffee beverage according to claim 1, wherein brown colorant is present to achieve an equivalent degree of coloration as compared to that achieved from a 0.004 to 0.009% by weight solution of Food Yellow No. 4.

12. The packaged coffee beverage according to claim 1, wherein a weight ratio of 4-caffeoylquinic acid to 3-caffeoylquinic acid is from 0.7 to 1.1.

13. The packaged coffee beverage according to claim 1, wherein a weight ratio of 4-caffeoylquinic acid to 3-caffeoylquinic acid is from 0.8 to 1.

14. The packaged coffee beverage according to claim 1, wherein a weight ratio of 5-caffeoylquinic acid to 3-caffeoylquinic acid is from 0.75 to 1.8.

15. The packaged coffee beverage according to claim 1, wherein a weight ratio of 5-caffeoylquinic acid to 3-caffeoylquinic acid is from 0.8 to 1.5.

16. The packaged coffee beverage according to claim 1, wherein said beverage has a pH of 4 to 7.

17. The packaged coffee beverage according to claim 1, wherein said beverage has a pH of 5 to 7.

18. The package coffee beverage according to claim 4, wherein said salts are present in an amount of from 0.03 to 0.3 wt. %.

19. The packaged coffee beverage according to claim 1, wherein the weight ratio of magnesium to sodium ratio is from 0.17 to 0.5.

* * * * *